(12) United States Patent
Shiomi

(10) Patent No.: US 11,784,557 B2
(45) Date of Patent: Oct. 10, 2023

(54) LOW LOSS SNUBBER CIRCUIT AND POWER SUPPLY DEVICE

(71) Applicant: SHARP KABUSHIKI KAISHA, Sakai (JP)

(72) Inventor: Takeshi Shiomi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 159 days.

(21) Appl. No.: 17/485,048

(22) Filed: Sep. 24, 2021

(65) Prior Publication Data

US 2022/0109365 A1 Apr. 7, 2022

(30) Foreign Application Priority Data

Oct. 5, 2020 (JP) .................................. 2020-168377

(51) Int. Cl.
*H02M 1/34* (2007.01)
(52) U.S. Cl.
CPC .................................. *H02M 1/346* (2021.05)
(58) Field of Classification Search
CPC .......... H02M 1/32; H02M 1/34; H02M 1/346; H02M 3/33592; H02M 3/33576; H02M 3/33573
See application file for complete search history.

(56) References Cited

U.S. PATENT DOCUMENTS

| 6,750,515 | B2* | 6/2004 | Ker | ...................... | H01L 27/1203 257/338 |
| 9,257,965 | B2* | 2/2016 | Knoedgen | ............... | H02M 1/08 |
| 2021/0408896 | A1* | 12/2021 | Shiomi | ............. | H02M 3/33592 |
| 2021/0408898 | A1* | 12/2021 | Shiomi | ................. | H02M 1/348 |
| 2023/0079668 | A1* | 3/2023 | Shiomi | .................... | H02H 3/18 361/84 |

FOREIGN PATENT DOCUMENTS

| JP | 2015186363 A | 10/2015 |
| JP | 2017-169256 A | 9/2017 |
| WO | 2017220133 A1 | 12/2017 |

* cited by examiner

*Primary Examiner* — Adolf D Berhane
(74) *Attorney, Agent, or Firm* — ScienBiziP, P.C.

(57) ABSTRACT

A snubber circuit connected to a rectifying circuit including a reference voltage node and a switch node, the snubber circuit comprises a snubber capacitor; and a P-type MOS transistor, wherein a positive electrode of the snubber capacitor is connected to the switch node, and a drain of the P-type MOS transistor is connected to a negative electrode of the snubber capacitor, and a source of the P-type MOS transistor is connected to the reference voltage node.

5 Claims, 5 Drawing Sheets

LOW LOSS SNUBBER CIRCUIT AND POWER SUPPLY DEVICE

CROSS-REFERENCE TO RELATED APPLICATION

The present application claims priority from Japanese Application JP 2020-168377, the content of which is hereby incorporated by reference into this application.

BACKGROUND

1. Field

The following disclosure relates to a snubber circuit.

A snubber circuit is used to suppress a surge voltage applied to a switch element. However, loss that, occurs in the snubber circuit is also problematic. JP 2017-169256 A discloses a circuit for reducing loss in a snubber circuit.

SUMMARY

However, even with such a snubber circuit, there is room for further loss reduction. One aspect of the present disclosure has an object to provide a snubber circuit capable of further reducing loss than in the related art.

In order to solve the above problem, a snubber circuit according to one aspect of the present disclosure is a snubber circuit that is connected to a rectifying circuit equipped with a reference voltage node and a switch node, and includes a snubber capacitor and a P-type MOS transistor. A positive electrode of the snubber capacitor is connected to the switch node, the drain of the P-type MOS transistor is connected to a negative electrode of the snubber capacitor, and the source of the P-type MOS transistor is connected to the reference voltage node.

According to one aspect of the present disclosure, it is possible to reduce loss in the snubber circuit.

DESCRIPTION OF EMBODIMENTS

First Embodiment

Figure 1:
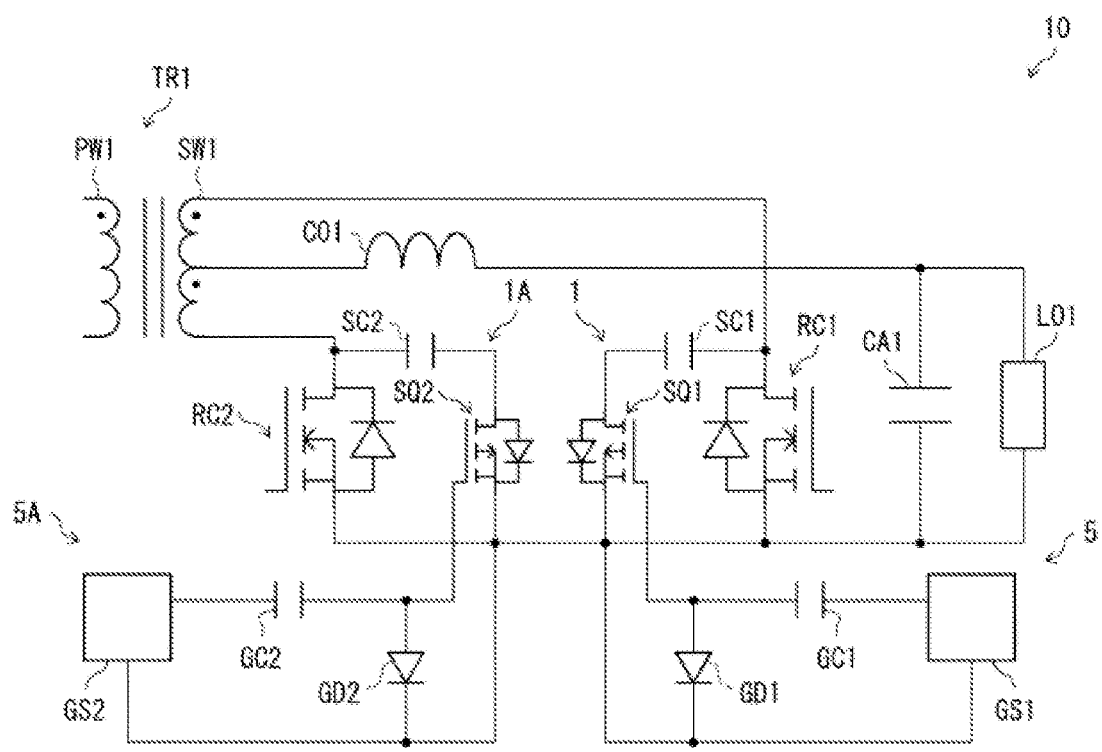
FIG. 1 is a diagram illustrating a snubber circuit, a gate drive circuit, and a rectifying circuit according to a first embodiment.
Figure 2:
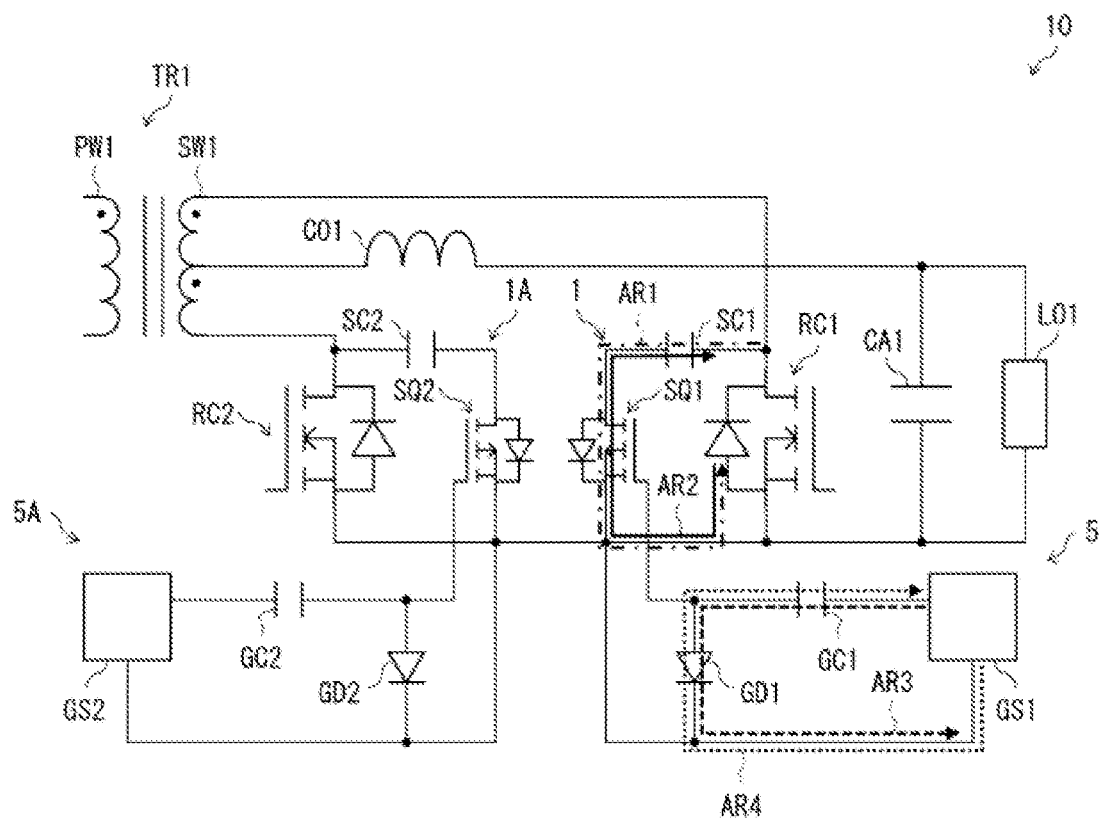
FIG. 2 is a diagram illustrating current paths of a snubber circuit and a gate drive circuit.
Figure 3:
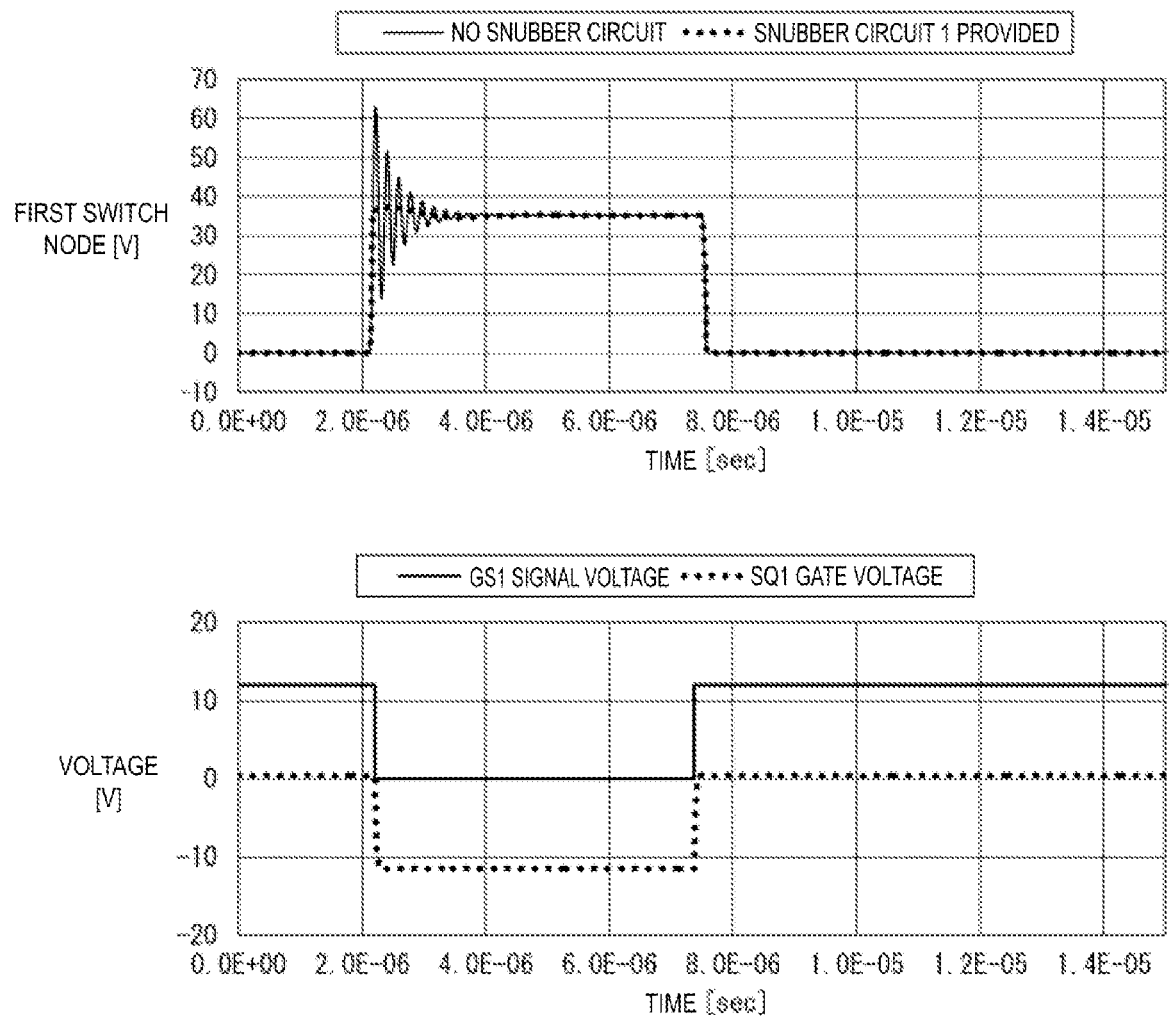
FIG. 3 is a diagram illustrating operation waveforms of a snubber circuit and a gate drive circuit.

A snubber circuit 1 according to a first embodiment suppresses a surge voltage gene-rated in a rectifying circuit 10, and also suppresses loss in the snubber circuit 1. Circuit configurations of the rectifying circuit 10, the snubber circuit 1, and a gate drive circuit 5 configured to control the snubber circuit 1 are illustrated in FIG. 1. Current paths involved in operations of the snubber circuit 1 and the gate drive circuit 5 are illustrated in FIG. 2. Operation waveforms of the snubber circuit 1 and the gate drive circuit 5 are illustrated in FIG. 3 using two graphs. The time axes of the two graphs are set to the same time axis. For the sake of brevity, a "load LO1" is also simply referred to as "LO1", for example, in the present disclosure. Note that each numerical value described below is merely an example.

Overview of Rectifying Circuit 10

The rectifying circuit 10 is connected to a secondary side of a transformer TR1 of an insulating DC-DC converter 100 (described below). The rectifying circuit 10 is referred to as a center tap rectifying circuit and converts an AC electromotive force of the transformer TR1 to a DC voltage.

Configuration of Rectifying Circuit 10

The transformer TR1 includes a primary winding PW1 and a secondary winding SW1. PW1 is connected to a primary side circuit and SW1 is connected to the rectifying circuit 10. SW1 is a two-turn winding, and one end of a smoothing coil CO1 is connected to a midpoint (center tap) of SW1. A positive electrode of a smoothing capacitor CA1 is connected to the other end of CO1. A negative electrode of CA1 is connected to a reference voltage node. The load LO1 is connected in parallel to CA1.

The rectifying circuit 10 includes the reference voltage node, a first switch node, and a second switch node. One end of SW1 is connected to the reference voltage node via a rectifying element RC1. A connection point between the one end of SW1 and FC1 is a first switch node. The other end of SW1 is connected to the reference voltage node via a rectifying element FC2. A connection point between the other end of SW1 and RC2 is the second switch node.

The voltage of the reference voltage node is 0 V. The positive electrode of CA1 is an output voltage node of 12.5 V. The voltage of the first switch node is switched to about 0 V when RC1 is conductive and switched to about 35 V when RC1 is not conductive. A voltage drop (about −1 V) in accordance with the amount of current in RC1 is added to 0 V when RC1 is conductive, and the voltage with the above voltage drop included is defined as a substantial reference voltage. The voltage of 35 V when RC1 is not conductive is a high voltage of the switch node. The high voltage does not include instantaneous voltages such as a surge voltage, noise and the like. These voltages are similarly defined in the second switch node.

CO1 has an inductance of 1.8 μH and a DC resistance of 0.3 mΩ. An average current is 80 A. CA1 has capacitance of 8.8 mF. RC1 and RC2 are N-type metal oxide semiconductor transistors (MOS transistors) each having a drain breakdown voltage of 30 V. The MOS transistors are connected in parallel such that on-resistance of each of RC1 and RC2 is 0.4 mΩ. The total sum of output capacitance is 24 nF (when the drain voltage is 35 V).

MOS transistors are used as the rectifying elements, but diodes may also be used. The rectifying elements refer to general elements configured to flow a current in only one direction. For example, the MOS transistor is defined as a rectifying element because "a current is conducted from the source to the drain, while a current from the drain to the source is blocked" at the time of the gate being off.

AC Operation and Surge Voltage of Rectifying Circuit

The voltages of the first and second switch nodes connected to SW1 are switched by an AC electromotive force having a frequency of 66 kHz. The voltage of the first, switch node is 35 V during a positive half-cycle and the voltage of the second switch node is 35 V during a negative half-cycle. A surge voltage is generated when the voltage is switched to 35 V, and instantaneously reaches 60 V when no snubber circuit is provided.

Configuration of Snubber Circuit

The snubber circuit 1 connected to the rectifying circuit 10 includes a snubber capacitor SC1 and a P-type MOS transistor SQ1. SC1 is a ceramic capacitor with a breakdown voltage of 100 V and capacitance of 3.8 μF at DC 35 V. SQ1 is a P-type MOS transistor with a breakdown voltage of 80 V, on-resistance of 85 mΩ, input capacitance of 1 nF, output capacitance of 200 pF (when the drain voltage is −35 V), and threshold voltage of −2.5 V.

In the snubber circuit 1 connected to the first switch node, the positive electrode of SQ1 is connected to the first switch node, the drain of SQ1 is connected to the negative electrode of SQ1, and the source of SQ1 is connected to the reference voltage node.

A snubber circuit 1A connected to the second switch node is configured using a snubber capacitor SC2 and a P-type MOS transistor SQ2 in a similar manner to that of the snubber circuit 1.

A case is considered in which circuit connection to charge a snubber capacitor is established via a parasitic diode of a MOS transistor. In a case where an N-type MOS transistor is used in the snubber circuit, the source terminal cannot be connected to the reference voltage node, which makes gate driving from the reference voltage node difficult. For example, gate driving from the reference voltage node is not easily performed in the K-type MOS transistor 223 in JP 2017-169256 A.

In a case where a P-type MOS transistor is used in the snubber circuit, the source terminal can be connected to the reference voltage node, which makes gate driving from the reference voltage node easy. Because of this, in the present embodiment, a P-type MOS transistor is used for each of the snubber circuits 1 and 1A.

Configuration of Gate Drive Circuit

The gate drive circuit 5 is connected to the gate of SQ1 of the snubber circuit 1. The configuration of the gate drive circuit 5 includes a gate drive signal generator GS1, a gate drive capacitor GC1, and a gate drive diode GD1.

A reference voltage terminal of GS1 is connected to the reference voltage node and an output terminal of GS1 is connected to the positive electrode of GC1 The negative electrode of GC1 is connected to the anode of GD1 and the gate of SQ1. The cathode of GD1 is connected to the reference voltage node. Although not illustrated, a 20Ω resistor is interposed on a path between the negative electrode of GC1 and the gate of SQ1 in order to adjust the gate drive speed of SQ1. In this way, components may be additionally provided at required locations.

GS1 is supplied with a power source voltage of 12 V and is able to output either the reference voltage of 0 V or the power source voltage of 12 V at any timing from the output terminal. SQ1 is a ceramic capacitor with a breakdown voltage of 50 V and capacitance of 68 nF at DC 12 V. In GD1, breakdown voltage is 80 V, rated current is 0.1 A, VF is 0.4 V at a conduction start point time (at approximately 0.1 mA), and resistance is 85 mΩ at the conduction time.

A gate drive circuit 5A is connected to the gate of SQ2 of the snubber circuit 1A. The gate drive circuit 5A includes a gate drive signal generator GS2, a gate drive capacitor GC2, and a gate drive diode GD2, The configuration of the gate drive circuit 5A is the same as that of the gate drive circuit 5.

Operation of Gate Drive Circuit 5 and Current Path

The gate drive circuit 5 is a circuit configured to shift the levels of signal voltages of 12 V and 0 V to voltages of 3 V and −12 V so as to turn on SQ1. When 12 V is output from the output terminal of GS1, GC1 is charged to approximately 12 V by using a path AF3 extending through GC1, GD1 and GS1. At this time, since a voltage of approximately 0 V (precisely, VF 0.4 V of GD1) is applied to the gate of SQ1, SQ1 turns off.

When 0 V is output from the output terminal of GS1, parasitic capacitance of GD1 is charged using a path AR4 extending through GS1, GD1, and GC1, so as to apply a reverse voltage to GD1. The magnitude of the reverse voltage is determined by the voltage of GC1, and −12 V is applied to the gate of SQ1 to turn on SQ1. On the paths AR3 and AR4, a current path (parallel to GD1) for charging and discharging input capacitance of SQ1 is omitted.

Operation Waveform of Gate Drive Circuit

The output of GS1 and the gate waveform of SQ1 for driving the snubber circuit 1 are described using the bottom graph in FIG. 3. At 1E-6 sec on the time axis in FIG. 3, the gate voltage of SQ1 is controlled to be approximately 0 V (OFF) by using the GS1 signal voltage of 12 V. Near 2E-6 sec, when the output of GS1 is switched to 0 V, the gate voltage of SQ1 changes to −12 V, and SQ1 is turned on. In this manner, control of turning on and off SQ1 is performed by shifting the level of output voltage of GS1 in a negative direction (−12 V) by the gate drive circuit 5. Thus, SQ1 is turned on by the reference voltage output of GS1, while SQ1 is turned off by positive voltage output of GS1.

Operation of Snubber Circuit and Current Path

When the first switch node switches from the substantial reference voltage to a high voltage of the switch node, a surge voltage is generates. The snubber circuit 1 absorbs this surge voltage and regenerates its power to the first switch node. The generated surge voltage charges SC1 using a path AR1 extending through SC1, SQ1, and RC1. At this time, it does not matter whether SQ1 is turned on or off. This is because SC1 is charged via the parasitic diode when SQ1 is turned off.

The absorbed surge power is regenerated to the first switch node when SQ1 is turned on. The path at this time is a path AR2 extending through RC1, SQ1, and SC1. The power regenerated to the first switch node is supplied to a load side via TR1, The on period of SQ1 is established within a high voltage period of the first switch node. In a case where SQ1 is turned on during other periods (periods in which the voltage of the first switch node is low), SC1 over-discharges and loss is generated in the snubber circuit.

Operation Waveform of Snubber Circuit

The top graph in FIG. 3 is for describing a surge voltage suppression effect of the first switch node. The graph depicts data of "no snubber circuit" and data of "snubber circuit 1 provided" in terms of the first switch node voltage. It may be understood that the surge voltage of the first switch node is greater than 60 V in the case of "no snubber circuit", but is suppressed to approximately 37 V in the case of "snubber circuit 1 provided".

In the present, embodiment, SQ1 is turned on within the high voltage period of the first switch node. Specifically, SQ1 is turned on when 50 nanoseconds have passed since the first switch node reached the high voltage. During this period of 50 nanoseconds, SC1 is charged via the parasitic diode of SQ1. Due to this, there is an advantage in that no problems occur even when the turning-on of SQ1 is delayed with respect to the timing of the generation of the surge voltage.

SQ1 is turned off 50 nanoseconds earlier than when the voltage of the first switch node drops to be lower than the high voltage of the first switch node. The above two 50-nanosecond periods are periods having a margin for time with respect to timing shifts. SQ1 is turned on within a period when the switch node is at the high voltage, which makes it possible to prevent over-discharge of SC1 and to reduce the loss in SQ1.

Improvements 1 and 2 of Snubber Circuit 1

In the first embodiment, a plurality of preferred improvements are applied. These preferred improvements will be described below.

Improvement 1: Capacitance of the Snubber Capacitor is not Less than Twice the Output Capacitance of the Rectifying Element RC1 is connected in a forward direction from the reference voltage node toward the first, switch node. In a case where the capacitance of SC1 is not less than twice the output capacitance of RC1, the snubber circuit 1 can more effectively suppress the surge voltage. Furthermore, the capacitance is preferably 10 times or more, and more preferably 100 times or more the output capacitance of PC1. When the capacitance of SC1 is not less than 1000 times the output capacitance of RC1, the surge voltage suppression effect is saturated, and the size of the capacitor becomes an issue. In the present embodiment, the capacitance of SC1 is 3.8 μF and the capacitance of RC1 is 24 nF. In the present embodiment, a more preferred surge power suppression effect is obtained.

Improvement 2: Output Capacitance of the P-Type MOS Transistor is not More than Half the Output Capacitance of the Rectifying Element The output capacitance of SQ1 connected to the rectifying circuit 1G functions as parallel capacitance with respect to the output capacitance of RC1. The output capacitance of RC1 flows a discharge current, when the voltage of the first switch node transitions to 0 V. Since this discharge current flows through the rectifying circuit 10 as a reactive current, the output, capacity of RC1 has to be made small. Accordingly, an increase in discharge current due to connecting the snubber circuit 1 needs to be suppressed. Therefore, the output capacitance of SQ1 is preferably not more than half the output capacitance of RC1. Furthermore, the output capacitance is preferably not more than one tenth, and more preferably not more than one hundredth the output capacitance of RC1. In a case where the output capacitance of SQ1 is reduced to be not more than one thousandth the output capacitance of RC1, the effect is saturated and the on-resistance of SQ1 becomes an issue.

Second Embodiment

Figure 4:
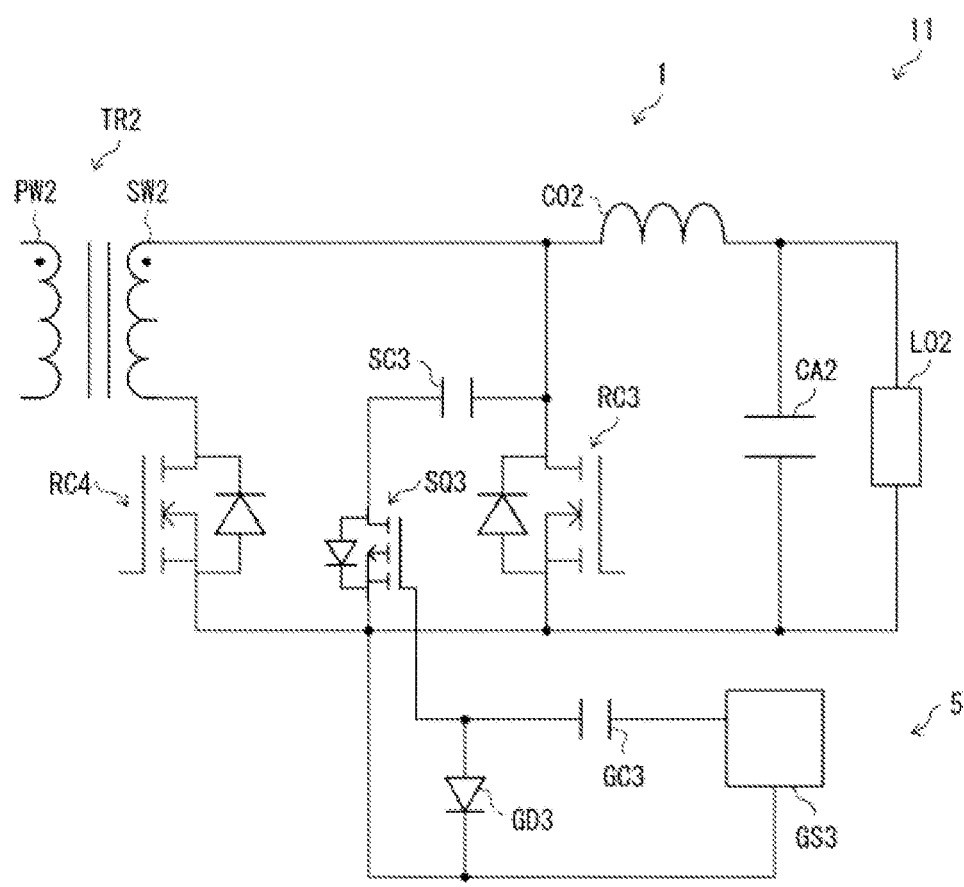
FIG. 4 is a diagram illustrating an application example of a snubber circuit according to a second embodiment.

The snubber circuit 1 is applicable to any rectifying circuit including a reference voltage node and a first switch node. The present embodiment describes an application example of the snubber circuit 1 to a half-wave rectifying circuit 11 illustrated in FIG. 4. The half-wave rectifying circuit 11 is connected to a transformer TR2. The transformer TR2 includes a primary winding PW2 and a secondary winding SW2. The half-wave rectifying circuit 11 includes RC3 and RC4 as rectifying elements. The half-wave rectifying circuit 11 further includes a smoothing coil CO2 and a smoothing capacitor CA2. The snubber circuit 1 includes a snubber capacitor SC3 and a P-type MOS transistor SQ3. The half-wave rectifying circuit 11 also includes the gate drive circuit 5 constituted of a gate drive signal generator GS3, a gate drive capacitor GC3, and a gate drive diode GD3.

The first switch node is a connection point between SW2 and RC3. The voltage of the reference voltage node is 0 V, the voltage of the output voltage node is 12.5 V, and the maximum voltage of the first switch node is 50 V. The snubber circuit 1 can also be applied to such a circuit.

Other application examples include a current doubler rectifying circuit and a full-bridge rectifying circuit. These circuits are rectifying circuits including the reference voltage node and the first and second switch nodes similar to the first embodiment, and therefore the snubber circuit 1 is applicable thereto.

Third Embodiment

Figure 5:
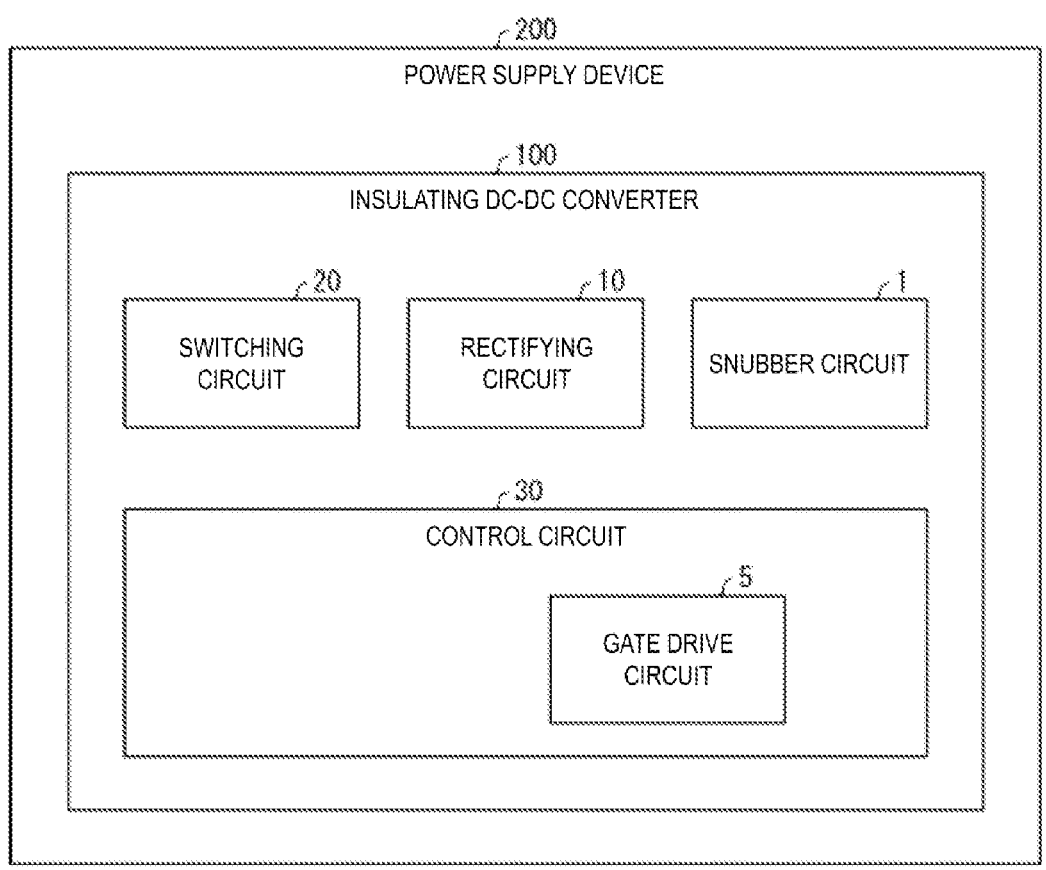
FIG. 5 is a diagram illustrating a power supply device according to a third embodiment.

FIG. 5 is a diagram illustrating a power supply device 200 including the snubber circuit 1. The power supply device 200 includes the insulating DC-DC converter 100. The insulating DC-DC converter 100 includes a switching circuit 20 as a primary side circuit, the rectifying circuit 10 as a secondary side circuit, the snubber circuit 1, and a control circuit 30. The gate drive circuit 5 is incorporated into the control circuit 30. The switching circuit 20 and the rectifying circuit 10 are connected via a transformer. The snubber circuit 1 is directly connected to the rectifying circuit 10. The control circuit 30 is connected so that the on/off of each element provided in the insulating DC-DC converter 100 can be controlled.

The power supply device 200 can reduce loss by including the snubber circuit 1.

Supplement

A snubber circuit according to a first aspect of the present disclosure is a snubber circuit connected to a rectifying circuit equipped with a reference voltage node and a switch node, and includes a snubber capacitor and a P-type MOS transistor. A positive electrode of the snubber capacitor is connected to the switch node, the drain of the P-type MGS transistor is connected to a negative electrode of the snubber capacitor, and the source of the P-type MOS transistor is connected to the reference voltage node.

According to the above-described configuration, surge power generated at the switch node charges the snubber capacitor via the P-type MOS transistor. The surge power that has charged the snubber capacitor may be regenerated to the switch node by turning on the P-type MOS transistor. Thus, loss in the snubber circuit can be reduced.

In a snubber circuit according to a second aspect of the present disclosure, a gate drive circuit is connected to the gate of the P-type MOS transistor; the gate drive circuit includes a gate drive signal generator, a gate drive capacitor, and a gate drive diode; a reference voltage terminal of the gate drive signal generator is connected to the reference voltage node, and an output terminal thereof is connected to a positive electrode of the gate drive capacitor; a negative electrode of the gate drive capacitor is connected to an anode of the gate drive diode and the gate of the P-type MOS transistor; and a cathode of the gate drive diode is connected to the reference voltage node.

According to the above configuration, it is possible to control turning on/off the P-type MOS transistor by using the gate drive signal generator configured to output a positive voltage and a reference voltage. With the output of the positive voltage, the gate drive diode becomes conductive, so that voltage accumulates in the gate drive capacitor and approximately 0 V is applied to the gate of the P-type MOS transistor to turn off the P-type MOS transistor. With the output of the reference voltage, the voltage accumulated in the gate drive capacitor applies a reverse voltage to the gate drive diode, the generated negative voltage is applied to the gate of the P-type MOS transistor, and then the P-type MOS transistor is turned on.

In a snubber circuit according to a third aspect of the present disclosure, the P-type MOS transistor is turned on by the reference voltage output of the gate drive signal generator, the P-type MOS transistor is turned off by the positive voltage output of the gate drive signal generator, the voltage of the switch node repeats taking a substantial reference voltage and a high voltage, and the P-type MOS transistor is turned on within a period of the switch node being at the high voltage.

According to the above configuration, suppressing overdischarge of the snubber capacitor makes it possible to reduce loss in the snubber circuit.

In a snubber circuit according to a fourth aspect of the present disclosure, a rectifying element is connected in a forward direction from the reference voltage node toward the switch node, and the capacitance of the snubber capacitor is not less than twice the output capacitance of the rectifying element.

According to the above-described configuration, the snubber capacitor is able to effectively suppress a surge voltage.

In a snubber circuit according to a fifth aspect of the present, disclosure, the output capacitance of the P-type MOS transistor is not more than half the output capacitance of the rectifying element.

According to the above configuration, a discharge current of the snubber circuit 1 can be reduced. When the voltage of the switch node drops, both the output capacitance of the rectifying element and the output capacitance of the P-type MOS transistor generate a reflux current. By suppressing the output capacitance of the P-type MOS transistor to be lower than the output capacitance of the rectifying element, an increase in discharge current due to the addition of the snubber circuit can be suppressed.

A power supply device according to a sixth aspect of the present disclosure includes the snubber circuit according to one aspect of the present disclosure.

According to the above-described configuration, a power supply device with reduced loss can be achieved by using the snubber circuit with reduced loss.

Supplementary Information

An aspect of the present disclosure is not limited to each of the embodiments described above. It is possible to make various modifications within the scope indicated in the claims. An embodiment obtained by appropriately combining technical elements each disclosed in different embodiments also falls within the technical scope of an aspect of the present disclosure. Furthermore, technical elements disclosed in the respective embodiments may be combined to provide a new technical feature.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A snubber circuit connected to a rectifying circuit including a reference voltage node and a switch node, the snubber circuit comprising:
   a snubber capacitor; and
   a P-type metal oxide semiconductor (MOS) transistor,
   wherein a positive electrode of the snubber capacitor is connected to the switch node,
   a drain of the P-type MOS transistor is connected to a negative electrode of the snubber capacitor and a source of the P-type MOS transistor is connected to the reference voltage node,
   a gate drive circuit is connected to a gate of the P-type MOS transistor,
   the gate drive circuit comprises a gate drive signal generator, a gate drive capacitor, and a gate drive diode,
   a reference voltage terminal of the gate drive signal generator is connected to the reference voltage node and an output terminal of the gate drive signal generator is connected to a positive electrode of the gate drive capacitor,
   a negative electrode of the gate drive capacitor is connected to an anode of the gate drive diode and the gate of the P-type MOS transistor, and
   a cathode of the gate drive diode is connected to the reference voltage node.

2. The snubber circuit according to claim 1,
   wherein the P-type MOS transistor is turned on by reference voltage output of the gate drive signal generator,
   the P-type MOS transistor is turned off by positive voltage output of the gate drive signal generator,
   a voltage of the switch node repeats taking a substantial reference voltage and a high voltage, and
   the P-type MOS transistor is turned on within a period of the switch node being at the high voltage.

3. The snubber circuit according to claim 1,
   wherein a rectifying element is connected in a forward direction from the reference voltage node toward the switch node, and
   capacitance of the snubber capacitor is not less than twice an output capacitance of the rectifying element.

4. The snubber circuit according to claim 3,
   wherein output capacitance of the P-type MOS transistor is not more than half the output capacitance of the rectifying element.

5. A power supply device comprising:
   the snubber circuit according to claim 1.

* * * * *